United States Patent [19]
Yamamoto

[11] Patent Number: 6,044,727
[45] Date of Patent: Apr. 4, 2000

[54] FLYWHEEL ASSEMBLY

[75] Inventor: Kozo Yamamoto, Daito, Japan

[73] Assignee: Exedy Corporation, Osaka, Japan

[21] Appl. No.: 09/120,323

[22] Filed: Jul. 22, 1998

[30] Foreign Application Priority Data

Jul. 31, 1997 [JP] Japan .................................. 9-206258

[51] Int. Cl.[7] .............................. F16F 15/10; G05G 1/00; F16D 13/68
[52] U.S. Cl. ........................... 74/574; 74/572; 192/70.17
[58] Field of Search .................. 74/574, 572; 192/70.12, 192/70.17

[56] References Cited

U.S. PATENT DOCUMENTS

| | | | |
|---|---|---|---|
| 4,871,342 | 10/1989 | Boss et al. ................................. | 464/98 |
| 5,511,446 | 4/1996 | Kajitani et al. ............................ | 74/572 |
| 5,515,745 | 5/1996 | Tsuruta et al. ............................. | 74/572 |
| 5,617,940 | 4/1997 | Fukushima et al. ................. | 192/70.17 |

*Primary Examiner*—Charles A. Marmor
*Assistant Examiner*—Tisha D. Waddell
*Attorney, Agent, or Firm*—Shinjyu Global IP Counselors, LLP

[57] ABSTRACT

A flywheel assembly is provided for transmitting torque from a crankshaft 2 to a main drive shaft 3. The flywheel assembly 1 basically includes a first flywheel 4, a second flywheel 5, a damper mechanism 6, a bearing 17 and a flexible plate 41. The flywheel assembly is designed to suppress the transmission of bending vibrations to the second flywheels. The second flywheel 5 is disposed adjacent to a side of the first flywheel 4 which is remote from the crankshaft 2. The damper mechanism 6 elastically couples the first and second flywheels 4 and 5 together in the circumferential direction. The flexible plate 41 is arranged axially between the first and second flywheels 4 and 5 for supporting the second flywheel 5 with respect to the first flywheel 4. The flexible plate 41 is flexible in the bending direction. The bearing 17 is arranged between the flexible plate 41 and one of the first and second flywheels 4 and 5.

24 Claims, 5 Drawing Sheets

Fig. 5

FLYWHEEL ASSEMBLY

BACKGROUND OF THE INVENTION

1. Field of the Invention

The present invention generally relates to a flywheel assembly. More specifically, the present invention relates to a flywheel assembly including first and second flywheels coupled together by a damper mechanism.

2. Background Information

A flywheel is attached, for example, to a rear end of a crankshaft of an engine of a vehicle for preventing nonuniform rotation during low-speed driving by its moment of inertia. The flywheel carries a ring gear for a starter and a clutch.

Such a flywheel assembly has been known that a flywheel is divided into first and second flywheels, and a damper mechanism is arranged between them for elastically coupling the flywheels together in the rotating direction. The damper mechanism includes elastic members which are circumferentially compressed when the first and second flywheels rotate relatively to each other. A certain type of damper mechanism includes a friction generating mechanism which operates in parallel with the elastic members.

An engine produces a drive force by converting a combustion power into a rotational force through a crankshaft. The combustion power bends the crankshaft and vibrates the flywheel assembly in the bending direction. Thereby, a reaction force is transmitted from the flywheel assembly to an engine block, and is further transmitted to a body of a vehicle through an engine mount to vibrate the body. As a result, noises occur during acceleration of the engine. The second flywheel is likely to vibrate in the bending direction. This is because an inner periphery of the second flywheel is carried on a projection of the first flywheel through a bearing, and the bearing has a low degree of freedom in the bending direction.

In view of the above, there exists a need for a flywheel, which overcomes the above mentioned problems in the prior art. This invention addresses this need in the prior art as well as other needs, which will become apparent to those skilled in the art from this disclosure.

SUMMARY OF THE INVENTION

An object is to provide a flywheel assembly, which suppresses transmission of a bending vibration to a second flywheel.

An object of the invention is to suppress transmission of a bending vibration to a second flywheel in a flywheel assembly.

According to a first aspect of the present invention, a flywheel assembly for transmitting a torque from an input rotation member to an output rotation member comprises a first flywheel, a second flywheel, a damper mechanism, a flexible plate and a bearing. The first flywheel is supplied with the torque from the input rotation member. The second flywheel is opposed to the first flywheel with the input rotation member therebetween for transmitting the torque to the output rotation member. The damper mechanism elastically couples the first and second flywheels together in a circumferential direction. A flexible plate is arranged axially between the first and second flywheels for supporting the second flywheel with respect to the first flywheel, and is flexible in a bending direction. The bearing is arranged between the flexible plate and at least one of the first and second flywheels.

According to the flywheel assembly of the above aspect of the present invention, the torque which is transmitted from the input rotation member to the first flywheel is transmitted to the second flywheel through the damper mechanism, and then is transmitted to the output rotation member. When a bending vibration is transmitted to the first flywheel from the input rotation member, the flexible plate arranged axially between the first and second flywheels bends in the bending direction. Therefore, the bending vibration is intercepted and absorbed by the flexible plate, and is restrained from transmission to the second flywheel.

According to a second aspect of the present invention, the flywheel assembly of the first aspect further has such a feature that the first flywheel is provided at its center with a projection projected toward the second flywheel, and the damper mechanism elastically couples the projection and the second flywheel together in the circumferential direction. The bearing has an inner race fixed around the projection and an outer race fixed to an inner peripheral portion of the flexible plate. The flexible plate is fixed at its outer peripheral portion to an outer peripheral portion of the second flywheel.

According to a third aspect of the present invention, the flywheel assembly of the first or second aspect of the present invention further includes a bending-direction dynamic damper. The bending-direction dynamic damper includes an inertia member and an elastic member coupling the inertia member to the second flywheel while allowing swing of the inertia member in the bending direction.

According to the flywheel assembly of the above aspect of the present invention, the flexible plate is combined with the bending-direction dynamic damper so that the bending vibration of the second flywheel can be reduced to a higher extent than a flywheel assembly not provided with the dynamic damper. This is because the bending-direction dynamic damper can reduce vibrations at frequencies around a resonance frequency of the bending vibration in a service range, which cannot be fully damped only by the flexible plate.

The foregoing and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring no to the attached drawings which form a part of this original disclosure.

DETAILED DESCRIPTION OF THE PREFERRED EMBODIMENTS

Figure 1:
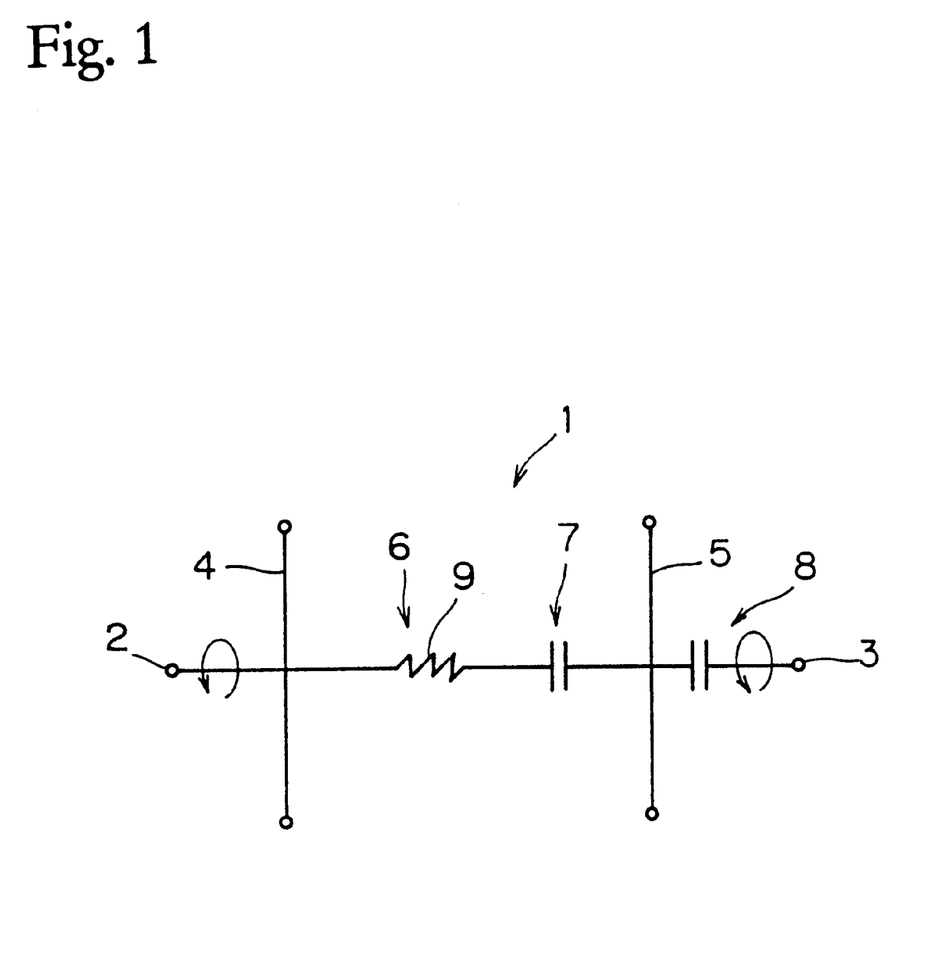
FIG. 1 is aschematic diagram showing a power transmission system with a flywheel assembly accordance with a first embodiment of the present invention.
Figure 2:
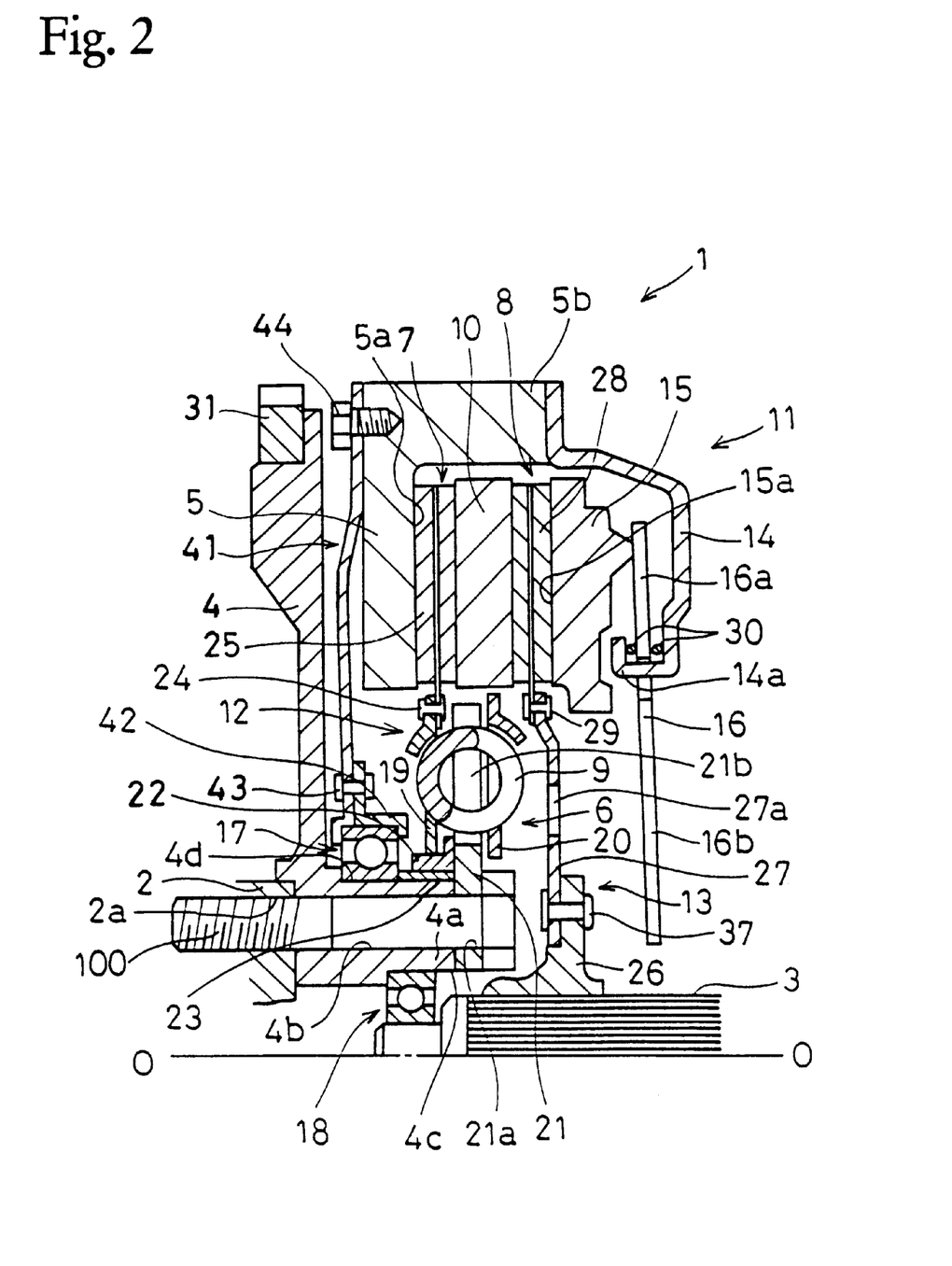
FIG. 2 is a partial cross-sectional view schematically showing the flywheel assembly of the first embodiment of the present invention.

Referring initially to FIG. 1, a diagram showing a power transmission system of a flywheel assembly 1 for a vehicle in accordance with one embodiment of the present invention. FIG. 2 is a partial cross-sectional view schematically showing the flywheel assembly 1. The flywheel assembly 1 is a power transmission mechanism for transmitting a torque from a crankshaft 2 (input rotation member) of an engine to a main drive shaft 3 (output rotation member) extending from a transmission. The flywheel assembly 1 has a damper function for dampening a torsional vibration and a clutch function for intercepting and transmitting the torque. The flywheel assembly 1 is basically formed of a first flywheel 4, a second flywheel 5 and a damper mechanism 6 arranged between the flywheels 4 and 5. The damper mechanism 6 includes coil springs 9 serving as elastic members for allowing relative rotation between the first and second flywheels 4 and 5 through a restricted range.

The flywheel assembly 1 further includes first and second clutches 7 and 8. The first clutch 7 is arranged between the first and second flywheels 4 and 5, and couples the damper mechanism 6 to the second flywheel 5. The second clutch 8 is arranged between the second flywheel 5 and the main drive shaft 3.

As shown in FIG. 2, the flywheel assembly 1 has a clutch cover assembly 11 (clutch operating mechanism) for operating the first and second clutches 7 and 8. The clutch cover assembly 11 can operate the first and second clutches 7 and 8 to intercept the torque transmission substantially simultaneously. The first and second clutches 7 and 8 can have either the substantially same torque capacities or may have different torque capacities as will be described later.

When the torque is transmitted from the crankshaft 2 to the first flywheel 4, the torque is then transmitted to the second flywheel 5 through the damper mechanism 6 and the first clutch 7. The torque of the second flywheel 5 is transmitted to the main drive shaft 3 through the second clutch 8. When a torque variation is transmitted from the engine, a relative rotation occurs between the first and second flywheels 4 and 5. In this operation, the coil springs 9 of the damper mechanism 6 are compressed to absorb and damp the torsional vibration.

A specific structure of the flywheel assembly 1 will now be described below with reference to FIG. 2. As shown in FIG. 2, line 0—0 represents a rotation axis of the flywheel assembly 1. In the following description, the left side of the flywheel assembly 1 as viewed in FIGS. 1 and 2 is referred to as an engine side, and the right side of the flywheel assembly 1 as viewed in FIGS. 1 and 2 is referred to as a transmission side.

The first flywheel 4 is formed of a thick circular plate. The first flywheel 4 is provided at its inner periphery with a cylindrical portion 4a (projection) extending axially toward the transmission. The cylindrical portion 4a is provided with a plurality of axial through-holes 4b. Each through-hole 4b is not provided with threads so that bolts 100 can pass therethrough. A ring gear 31 is fixed to an outer peripheral surface of the first flywheel 4.

Similarly to the first flywheel 4, the second flywheel 5 is formed of a thick circular plate. The second flywheel 5 is arranged on the transmission side with respect to the first flywheel 4, and is spaced therefrom by a predetermined distance. The second flywheel 5 has a central hole, through which the cylindrical portion 4a extends toward the transmission. The second flywheel 5 is provided at its transmission side with a flat friction surface 5a having an annular form. The second flywheel 5 is provided at its outer periphery with a plurality of projections 5b extending axially toward the transmission.

Description will now be given on a first bearing 17 and a flexible plate 41 for supporting the second flywheel 5 with respect to the first flywheel 4. The first bearing 17 is employed for reducing a frictional resistance between the first and second flywheels 4 and 5 during relative rotation between them. The first bearing 17 is arranged around an outer peripheral surface 4d of the cylindrical portion 4a. The first bearing 17 includes inner and outer races as well as a plurality of rollers arranged between the races. The inner race of the first bearing 17 is fixedly coupled to the outer peripheral surface 4d of the cylindrical portion 4a. An end surface of the inner race of the first bearing 17, which is opposed to the engine, is in contact with and supported by the first flywheel 4.

The flexible plate 41 is employed for supporting the second flywheel 5 with respect to the first flywheel 4. The flexible plate 41 is arranged axially between the first and second flywheels 4 and 5, and is formed of, e.g., a circular steel plate having a relatively small thickness. An inner peripheral portion of the flexible plate 41 is fixedly coupled to the outer race of the first bearing 17, while an outer peripheral portion of the flexible plate 41 is fixedly coupled to the outer peripheral portion of the second flywheel 5. Since the flexible plate 41 is flexible in the bending direction, i.e., in a substantially axial direction, the first and second flywheels 4 and 5 are moveable relatively to each other in the axial direction as well as in the rotational direction.

A manner of fixing the flexible plate 41 will be described below more in detail. The inner peripheral portion of the flexible plate 41 has a bent form, which is in contact with the outer peripheral surface and the engine-side end surface of the outer race. An annular plate 42 is fixedly coupled to the inner peripheral portion of the flexible plate 41 by a plurality of rivets 43 for securing the first bearing 17 thereto. Specifically, the annular fixing plate 42 is in contact with the outer peripheral surface, the outer race at the transmission-side end surface of the outer race. Thus, the flexible plate 41 is firmly fixed to the outer race of the first bearing 17 together with the fixing plate 42. The outer peripheral portion of the flexible plate 41 is fixedly coupled to a radially facing side surface of the second flywheel 5 by a plurality of bolts 44. In particular, the outer portion of the side surface of the second flywheel 5 has threaded bores that receive bolts 44 therein.

Through the first bearing 17 and the flexible plate 41 described above, the second flywheel 5 is rotatably supported by the first flywheel 4. Also, the second flywheel 5 can axially move relatively to the first flywheel 4 through a predetermined range due to the resiliency of the flexible plate 41. Thus, the second flywheel 5 can oscillate or swing in the bending direction. Instead of the circular form, the flexible plate 41 can have a spoke-wheel-like form with a plurality of radial arms or can be provided with apertures or recesses as needed and/or desired.

The first flywheel 4 has a second bearing 18 attached to its inner periphery. The second bearing 18 is coupled to the main drive shaft 3 for rotatably supporting the first flywheel 4 on the inner end of the main drive shaft 3. The second bearing 18 is arranged between an inner peripheral surface 4c of the cylindrical portion 4a and the main drive shaft 3. The second bearing 18 is formed of inner and outer races as well as a plurality of rollers arranged therebetween. The outer race of the second bearing 18 is fixedly coupled to the inner peripheral surface 4c of the cylindrical portion 4a. The side surface of the outer race opposed to the engine is in contact with and supported by the first flywheel 4. The inner race of the second bearing 18 is in contact with the outer peripheral surface of the inner end of the main drive shaft 3.

The first clutch disk assembly 12 is employed for transmitting the torque from the first flywheel 4 to the second flywheel 5. The first clutch disk assembly 12 is basically formed of the damper mechanism 6 and the first clutch 7. The damper mechanism 6 of the first clutch disk assembly 12 basically includes a clutch plate 19, a retaining plate 20, a drive plate 21 and the coil springs 9. The clutch and retaining plates 19 and 20 each have an annular form, and are arranged between the cylindrical portion 4a and the inner periphery of the second flywheel 5. The clutch plate 19 and the retaining plate 20 are fixed together with pins (not shown) or the like.

The annular drive plate 21 is arranged axially between the clutch plate 19 and the retaining plate 20. The drive plate 21 is provided at its inner peripheral portion with holes 21a corresponding to the holes 4b of the cylindrical portion 4a, respectively. Crank bolts 100 are inserted into the holes 21a of the drive plate 21 and the holes 4b of the first flywheel 4, and are then screwed into screw holes 2a formed at the crankshaft 2, respectively. The drive plate 21 is provided at its radially outer portion with spring accommodating portions or slots 21b for accommodating the coil springs 9 therein.

The coil springs 9 are arranged within the spring accommodating portions 21b. The clutch and retaining plates 19 and 20 have cut and bent portions, which restrict radial and axial movements of the coil springs 9, and support the circumferentially opposite ends of the coil springs 9. Thus, the coil springs 9 are arranged to transmit the torque from the drive plate 21 to the clutch and retaining plates 19 and 20. The inner periphery of the clutch plate 19 is supported by bushings 22 and 23 arranged around the outer peripheral surface 4d of the cylindrical portion 4a. The clutch plate 19 has a first friction facing 25 fixedly coupled thereto by first rivets 24. The first friction facing 25 is formed of a core plate and friction members fixedly coupled to the opposite surfaces of the core plate. The first friction facing 25 is arranged adjacent to the friction surface 5a of the second flywheel 5.

As described above, the first clutch disk assembly 12 includes the damper mechanism 6 formed of the coil springs 9. The first clutch disk assembly 12, and thus, the damper mechanism 6 are both arranged on the transmission side with respect to the second flywheel 5. In other words, the damper mechanism 6 and the first clutch disk assembly 12 are not located physically between the first and second flywheels 4 and 5 in an axial direction. This arrangement of the first clutch disk assembly 12 and the damper mechanism 6 facilitate an operation of exchanging or removing them for replacement.

The intermediate member 10 is a relatively thick annular member or ringshaped member. The intermediate member 10 is arranged on the transmission side with respect to the first friction facing 25 of clutch 7. The axially opposite end surfaces of the intermediate member 10 form flat frictional engagement surfaces. Several projections (not shown) are formed at the outer periphery of the intermediate member 10. These projections are engaged with the projections 5b of the second flywheel 5 so that the intermediate member 10 is non-rotatable but axially movable through a predetermined range with respect to the second flywheel 5.

The second clutch disk assembly 13, which includes clutch 8, is employed for transmitting the torque from the second flywheel 5 to the main drive shaft 3. The second clutch disk assembly 13 is basically formed of a spline hub 26, a plate 27 and a second friction facing 28. The spline hub 26 is formed of a cylindrical boss extending in the axial direction, and a flange extending radially outward from the boss. The boss has a spline hole engaged with spline teeth, which are formed at the outer peripheral surface of the main drive shaft 3. Owing to this engagement, the spline hub 26 is non-rotatable but axially movable with respect to the main drive shaft 3. The flange of the spline hub 26 is fixedly coupled to an inner peripheral portion of the circular plate 27 by a plurality of third rivets 37. An outer peripheral portion of the plate 27 is fixedly coupled to the second friction facing 28 by a plurality of second rivets 29. The second friction facing 28 has the same structure as the first friction facing 25. The second friction facing 28 is arranged between the side surface of the intermediate member 10 opposed to the transmission and a pressing surface 15a of the pressure plate 15 opposed to the transmission, which will be described later. The plate 27 is provided with a plurality of holes 27a, through which an air can be supplied from the transmission side to the damper mechanism 6.

The clutch cover assembly 11 functions as a clutch operating mechanism, which is formed of a clutch cover 14, a pressure plate 15 and a diaphragm spring 16. The clutch cover 14 is an annular member having an outer peripheral portion, which is fixedly coupled to the projections 5b of the second flywheel 5, e.g., by bolts. The inner peripheral portion of the clutch cover 14 is located near the inner periphery of the friction surface 5a of the second flywheel 5. The pressure plate 15 has an annular form, which is located radially inside the clutch cover 14. The pressure plate 15 is fixedly coupled to the clutch cover 14 by strap plates (not shown), and is nonrotatable but axially movable with respect to the clutch cover 14.

The diaphragm spring 16 is arranged between the clutch cover 14 and the pressure plate 15. The diaphragm spring 16 is formed of an annular elastic portion 16a and a plurality of levers 16b extending radially inward from the elastic portion 16a. The elastic portion 16a is swingably supported at its inner peripheral portion by the clutch cover 14 through two wire rings 30. The outer peripheral portion of the elastic portion 16a is in contact with the surface of the pressure plate 15, which is opposed to the pressure plate 15. The elastic portion 16a is axially compressed between the clutch cover 14 and the pressure plate 15, and biases the pressure plate 15 toward the friction surface 15a of the second flywheel 5. A release mechanism (not shown) is arranged near the ends of the levers 16b. When the release mechanism pushes the levers 16b toward the engine, the diaphragm spring 16 no longer applies the biasing force to the pressure plate 15.

The foregoing structure can be summarized as follows. The first friction facing 25 as well as the portions of the second flywheel 5 and the intermediate member 10 facing the first friction facing 25 form the first clutch 7. The second friction facing 28 as well as the portions of the intermediate member 10 and the pressure plate 15 facing the second friction facing 28 form the second clutch 8.

The operation of the flywheel assembly 1 will now be described. During a normal driving, a driver does not depress a clutch pedal, and therefore, the release mechanism does not deform the diaphragm spring 16 so that the elastic portion 16a of the diaphragm spring 16 applies a load to the pressure plate 15. In this state, the first friction facing 25 is held between the second flywheel 5 and the intermediate member 10, and the second friction facing 28 is held between the intermediate member 10 and the pressure plate 15. Thus, both the first and second clutches 7 and 8 are engaged In this state, the torque of the first flywheel 4 is transmitted to the second flywheel 5 through the damper mechanism 6 and the first clutch 7. Moreover, in this state, is further transmitted to the main drive shaft 3 through the second clutch 8.

When a torque variation of the engine is transmitted to the flywheel assembly 1 and the clutches 7 and 8 are engaged, the first and second flywheels 4 and 5 rotate relatively to each other with the damper mechanism 6 therebetween. Thereby, the coil springs 9 are circumferentially compressed to absorb and dampen the vibration.

When the driver depresses the clutch pedal, the release mechanism (not shown) pushes the ends of the levers 16b of the diaphragm spring 16 toward the engine. Thereby, the elastic portion 16a no longer applies the load to the pressure plate 15 so that the pressure plate 15 moves toward the transmission. Consequently, the first and second clutches 7 and 8 are released. In this state, the second flywheel 5 is disengaged from both the first flywheel 4 and the second clutch disk assembly 13.

The measures taken by flywheel assembly 1 against a problem caused by passage through a torsional vibration resonance point in a low rotation speed region will now be discussed. For these measures, the driver depresses the clutch pedal when starting the engine. Thereby, both the first and second clutches 7 and 8 are simultaneously released as described before. The second flywheel 5 is then dynamically disengaged from both the engine side and the transmission side. In this operation, the moment of inertia of the output side of the damper mechanism 6 is small so that any resonance which may occur in a range lower than the idling speed can be suppressed.

The torque capacity of the first clutch 7 may be smaller than the torque capacity of the second clutch 8 so that the first clutch 7 may function as a torque limiter. For this, the first friction facing 25 having a smaller friction coefficient than the second friction facing 28 is employed. In this case, it is possible to dampen an excessive torque variation at a resonance point in a low rotation speed region even if the clutch is engaged. The second clutch 8 has the torque capacity substantially equal to that of a conventional clutch. The torque capacity of the first clutch 7 is smaller than a stop torque of the damper mechanism 6. Thereby, the torsional vibration is dampened by sliding of the first clutch 7 when an excessive torque variation exceeding the stop torque of the damper mechanism 6 is supplied to the flywheel assembly 1. Since the damper mechanism 6 does not twist to the allowable maximum torsion angle, a large load is not applied thereto, and a long lifetime can be ensured.

The operation of exchanging or removing the damper mechanism 6 will now be discussed. For exchanging or replacing the damper mechanism 6, i.e., the first clutch disk assembly 12, the clutch cover assembly 11 is first removed from the second flywheel assembly 5. Then, the second clutch disk assembly 13 and the intermediate member 10 are both removed. Then, the crank bolts 100 are removed so that remaining members of the flywheel assembly 1 can be removed from the crankshaft 2, and the first clutch disk assembly 12 (i.e., damper disk 6) can be removed from both the first and second flywheels 4 and 5. Since the damper mechanism 6 is arranged on the transmission side with respect to the second flywheel 5, the damper mechanism 6 can be easily replaced. Since friction engagement utilizing the first friction facing 25 is utilized for coupling the damper mechanism 6 and the second flywheel 5 together, this facilitates removal.

Figure 3:
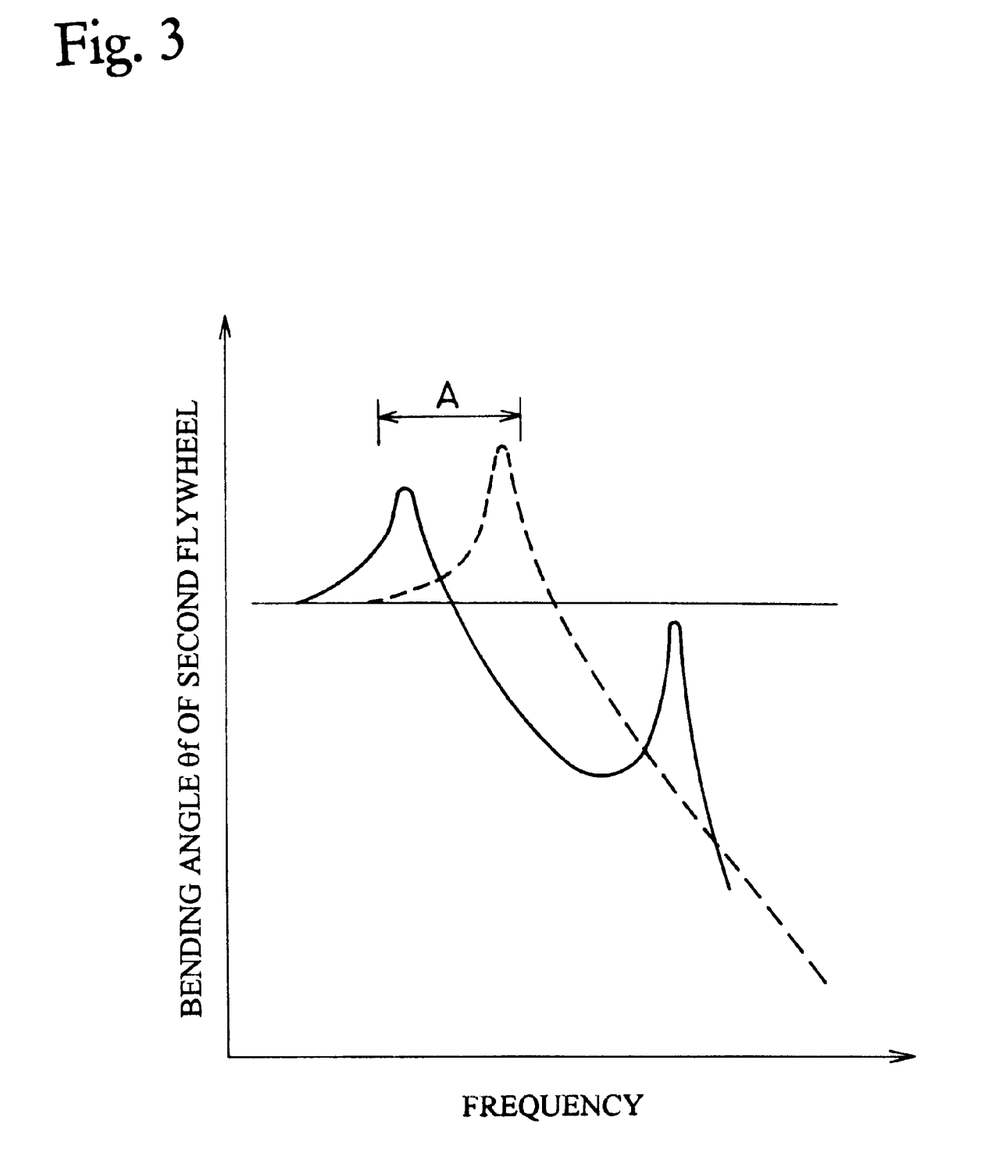
FIG. 3 is a graph illustrating the bending vibration characteristics of a second flywheel of the first embodiment of the present invention.

The measures against bending vibrations will now be discussed. Referring now to FIG. 3, a graph is illustrated showing the bending vibration characteristics of the second flywheel 5 in this embodiment. The dotted line in the graph of FIG. 3 represents characteristics of a conventional flywheel assembly in which a second flywheel is supported by a first flywheel only through a bearing. The solid line in the graph of FIG. 3 represents the characteristics of the flywheel assembly 1 of the invention, in which the second flywheel 5 is supported by the first flywheel 4 through the first bearing 17 and the flexible plate 41.

According to the conventional characteristics represented by the dotted line in the graph of FIG. 3, a resonance frequency is present within a service region A. According to the characteristics of the invention represented by solid line in the graph of FIG. 3, there are two resonance frequencies apart from each other, and both the two resonance frequencies are lower in vibration level (bending angle of the second flywheel 5) than the resonance frequency in the conventional characteristics. Further, the two resonance frequencies are shifted from the service region A toward high and low frequency sides, respectively. By shifting the resonance frequencies from the service region A, the bending vibration of the second flywheel 5 is suppressed.

Forms and structures of the flywheel assembly of the present invention can be different from those of the foregoing embodiment of the present invention. Also, the first and second flywheels as well as the damper mechanism forming the flywheel assembly can have structures and forms different from those of the foregoing embodiment. For example, the damper mechanism can have a mechanism for generating a frictional resistance and/or a mechanism for generating a viscous resistance. The coil springs 9 can be replaced with other springs or elastic members.

SECOND EMBODIMENT

Figure 4:
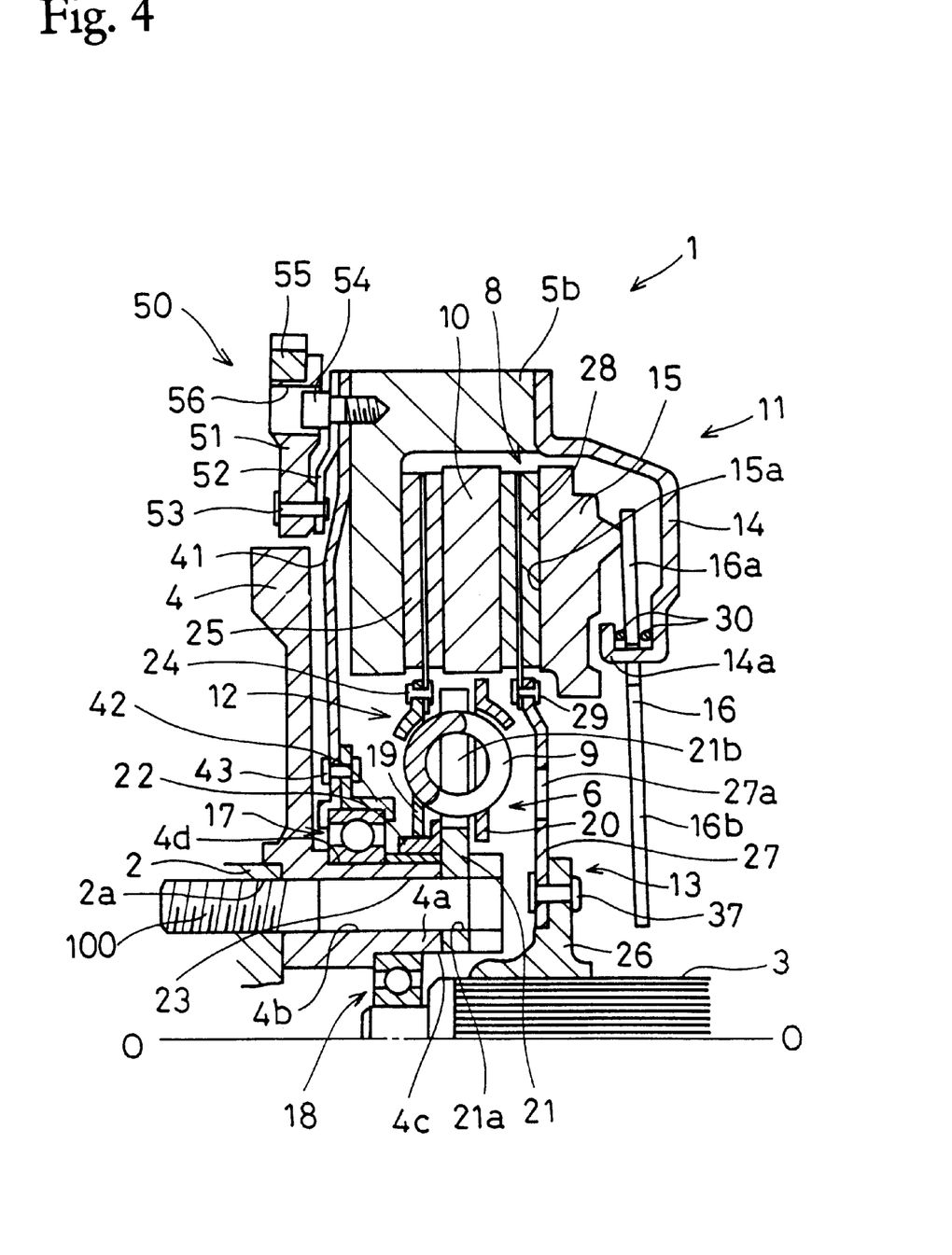
FIG. 4 is a partial cross-sectional view schematically showing a flywheel assembly in accordance with a second embodiment of the present invention.

As shown in FIG. 4, a bending-direction dynamic damper 50 may be added to the flywheel assembly 1 of the foregoing embodiment. The bending-direction dynamic damper 50 is operable to dampen the vibration of the flywheel 5 in the bending direction together with the flexible plate 41. The bending-direction dynamic damper 50 is attached to an engine-side portion of the outer peripheral portion of the second flywheel 5. The bending-direction dynamic damper 50 is basically formed of a mass member 51 and a plate 52. The mass member 51 is an annular member having a relatively large thickness, and is arranged adjacent to the surface of the outer peripheral portion of the second flywheel 5 opposed to the engine. A ring gear 55 is fixed to the outer periphery of the mass member 51.

The plate 52 is an annular pressed plate, which is disposed between the mass member 51 and the outer peripheral portion of the flexible plate 41. The plate 52 functions as a spring or an elastic member which couples the mass member 51 to the second flywheel 5 while allowing an oscillating movement in the bending direction. The inner peripheral portion of the plate 52 is fixedly coupled to the inner peripheral portion of the mass member 51 by a plurality of rivets 53. The outer peripheral portion of the plate 52 is fixedly coupled to the second flywheel 5 together with the outer peripheral portion of the flexible plate 41 by a plurality of bolts 54. In this manner, the mass member 51 is supported swingably in the bending direction by the second flywheel 5 through the plate 52. Holes 56 are formed at positions of the mass member 51 corresponding to the heads of the bolts 54, respectively. The holes 56 are provided for inserting the bolts 54 when coupling the bending-direction dynamic damper 50 to the second flywheel 5. The holes 56 also function to avoid interference of the mass member 51 with the heads of the bolts 54 when it swings or oscillates with respect to the flywheel 5.

Figure 5:
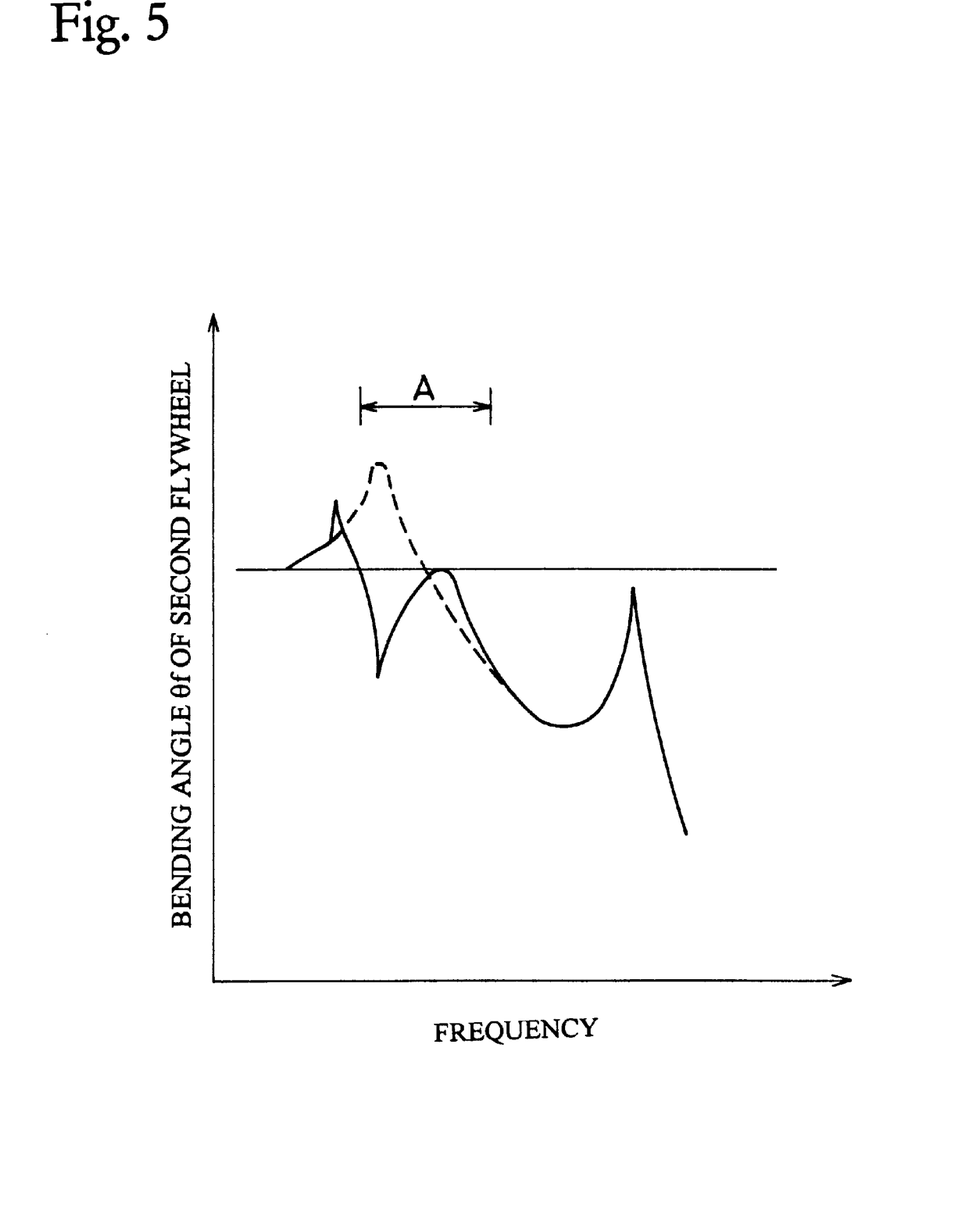
FIG. 5 it a graph illustrating the bending vibration characteristics of a second flywheel of the second embodiment of the present invention.

Referring now to FIG. 5, a graph illustrates the bending vibration characteristics of the second flywheel 5 of the first and second embodiments. The dotted line in the graph of FIG. 3 represents the characteristics of the first embodiment already described, and the solid line in the graph of FIG. 3 represents the characteristics of this embodiment. The characteristics of the first embodiment employing only the flexible plate, which are represented by the dotted line in the graph of FIG. 3, include the two resonance frequencies in the divided regions, but the lower one of these two frequencies may be present in the service region A. According to the characteristics of the second embodiment employing the flexible plate and the dynamic damper, which are represented by the solid line in the graph of FIG. 3, the bending-direction dynamic damper 50 divides the above lower resonance frequency into two resonance frequencies. The divided two resonance frequencies are lower in vibration level than the foregoing lower resonance frequency. In particular, the lower one of the divided resonance frequencies is shifted from the service region A.

As described above, combination of the bending-direction dynamic damper 50 with the flexible plate 41 can reduce the vibrations at and around the resonance frequency of the bending vibration remaining in the service region A.

The structure of the bending-direction dynamic damper 50 is not restricted to the precise structure of this embodiment. The elastic member forming the dynamic damper can be an elastic member other than the plate spring. For example, the elastic member can be another spring or a rubber member. Moreover, the bending-direction dynamic damper 50 may be combined with a member (e.g., the first flywheel) other than the second flywheel.

According to the flywheel assembly of the present invention, the second flywheel 5 is supported by the first flywheel 4 through the flexible plate 41 which is flexible in the bending direction. Therefore, the bending vibration is intercepted and absorbed by the flexible plate 41, and transmission thereof to the second flywheel 5 can be suppressed.

While several embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A flywheel assembly for transmitting a torque from an input rotation member to an output rotation member, said flywheel assembly comprising:
    a first flywheel configured to be mounted to the input rotation member for receiving torque therefrom;
    a second flywheel opposed to said first flywheel, with said second flywheel being operatively coupled to the input rotation member for transmitting the torque to the output rotation member;
    a damper mechanism elastically coupling said first and second flywheels together in a circumferential direction;
    a flexible plate arranged axially between said first and second flywheels for supporting said second flywheel with respect to said first flywheel, and being flexible in a bending direction; and
    a bearing arranged between said flexible plate and one of said first and second flywheels.

2. The flywheel assembly according to claim 1, wherein said first flywheel is provided at its center with a projection extending toward said second flywheel, and said damper mechanism elastically couples said projection and said second flywheel together in the circumferential direction.

3. The flywheel assembly according to claim 2, wherein said bearing has an inner race fixedly coupled around said projection and an outer race fixedly coupled to an inner peripheral portion of said flexible plate.

4. The flywheel assembly according to claim 3, wherein said flexible plate is fixed at its outer peripheral portion to an outer peripheral portion of said second flywheel.

5. The flywheel assembly according to claim 4, further comprising
    a bending-direction dynamic damper having an inertia member and an elastic member coupling said inertia member to said second flywheel while allowing movement of said inertia member in the bending direction.

6. The flywheel assembly according to claim 1, further comprising
    a first clutch disposed between said damper mechanism and one of said first and second flywheels.

7. The flywheel assembly according to claim 6, further comprising
    a second clutch having an inner peripheral portion configured to be mounted to the output rotation member and an outer peripheral portion disposed adjacent to said second flywheel.

8. The flywheel assembly according to claim 7, wherein said second flywheel has a cover member coupled thereto with a lever member coupled thereto for movement between a clutch disengaged position and a clutch engaged position.

9. The flywheel assembly according to claim 8, further comprising
    a pressure plate disposed between said lever member and at least one of said first and second clutches.

10. The flywheel assembly according to claim 1, further comprising
    a bending-direction dynamic damper having an inertia member and an elastic member coupling said inertia member to said second flywheel while allowing movement of said inertia member in the bending direction.

11. The flywheel assembly according to claim 10, wherein said inertia member has a ring gear coupled to its outer periphery.

12. The flywheel assembly according to claim 10, wherein said inertia member is coupled to said elastic member in a cantilevered manner.

13. The flywheel assembly according to claim 12, wherein said elastic member is coupled to said first flywheel in a cantilevered manner.

14. The flywheel assembly according to claim 10, wherein said elastic member is coupled at its outer periphery to said outer periphery of said first flywheel.

15. The flywheel assembly according to claim 14, wherein said inertia member is coupled at its inner periphery to an inner peripheral portion of said elastic member.

16. The flywheel assembly according to claim 15, wherein said flexible plate is coupled at its outer periphery to said first flywheel, and has an attachment portion at its inner periphery rotatably coupled to the input rotation member by said bearing.

17. The flywheel assembly according to claim 10, wherein an outer peripheral portion of said flexible plate and an outer peripheral portion of said elastic member are coupled together.

18. The flywheel assembly according to claim 17, wherein said inertia member is coupled at its inner periphery to an inner peripheral portion of said elastic member.

19. The flywheel assembly according to claim 18, wherein said outer peripheral portions of said flexible plate and said elastic member are coupled to said flywheel by at least one bolt.

20. The flywheel assembly according to claim 19, wherein said inertia member is provided with at least one opening which is aligned with said bolt.

21. The flywheel assembly according to claim 10, further comprising
a first clutch disposed between said damper mechanism and one of said first and second flywheels.

22. The flywheel assembly according to claim 21, further comprising
a second clutch having an inner peripheral portion configured to be mounted to the output rotation member and an outer peripheral portion disposed adjacent to said second flywheel.

23. The flywheel assembly according to claim 22, wherein said second flywheel has a cover member coupled thereto with a lever member coupled thereto for movement between a clutch disengaged position and a clutch engaged position.

24. The flywheel assembly according to claim 23, further comprising
a pressure plate disposed between said lever member and at least one of said first and second clutches.

* * * * *